(12) United States Patent
Arora

(10) Patent No.: US 10,302,337 B2
(45) Date of Patent: May 28, 2019

(54) AMMONIA PLANT UPGRADING-MULTISTAGE INTEGRATED CHILLING OF PROCESS AIR COMPRESSOR WITH AMMONIA COMPRESSOR FOLLOWED BY AIR FLOW SPLIT AND MULTISTAGE AIR PREHEATING TO SECONDARY AMMONIA REFORMER

(71) Applicant: Vinod Kumar Arora, Katy, TX (US)

(72) Inventor: Vinod Kumar Arora, Katy, TX (US)

( * ) Notice: Subject to any disclaimer, the term of this patent is extended or adjusted under 35 U.S.C. 154(b) by 35 days.

(21) Appl. No.: 15/682,974

(22) Filed: Aug. 22, 2017

(65) Prior Publication Data

US 2017/0350627 A1     Dec. 7, 2017

Related U.S. Application Data

(62) Division of application No. 14/241,018, filed as application No. PCT/US2013/054951 on Aug. 14, 2013, now Pat. No. 9,772,129.

(60) Provisional application No. 61/706,305, filed on Sep. 27, 2012, provisional application No. 61/684,684, filed on Aug. 17, 2012.

(51) Int. Cl.
*C01C 1/04* (2006.01)
*F25B 29/00* (2006.01)
*F25B 7/00* (2006.01)

(52) U.S. Cl.
CPC .......... *F25B 29/003* (2013.01); *C01C 1/0405* (2013.01); *F25B 7/00* (2013.01); *B01J 2219/00006* (2013.01); *Y02P 20/129* (2015.11); *Y02P 20/52* (2015.11)

(58) Field of Classification Search
CPC ........ F25B 29/003; F25B 7/00; C01C 1/0405; Y02P 20/52; Y02P 20/129; B01J 2219/00006
See application file for complete search history.

(56) References Cited

U.S. PATENT DOCUMENTS

| | | |
|---|---|---|
| 4,022,030 A | 5/1977 | Brugerolle |
| 4,464,228 A | 8/1984 | Roensch |
| 4,869,888 A | 9/1989 | O'Neill |
| 5,842,345 A | 12/1998 | Scharpf |
| 5,935,544 A | 8/1999 | Bhakta |
| 6,170,263 B1 | 1/2001 | Chow |
| 7,821,158 B2 | 10/2010 | Vandor |
| 7,967,896 B2 | 6/2011 | Lechnick |
| 8,020,404 B2 | 9/2011 | Vandor |
| 2008/0170980 A1 | 7/2008 | Reddy |
| 2009/0049836 A1 | 2/2009 | Erickson |
| 2011/0000256 A1 | 1/2011 | Vandor |

(Continued)

FOREIGN PATENT DOCUMENTS

| | | |
|---|---|---|
| EP | 115752 B1 | 12/1986 |
| EP | 0585934 A1 | 3/1994 |
| EP | 0585934 B1 | 4/1998 |

(Continued)

*Primary Examiner* — Ana M Vazquez
(74) *Attorney, Agent, or Firm* — Nolte Intellectual Property Law Group

(57) ABSTRACT

An ammonia plant system upgrade utilizing both a direct and indirect multistage chilling system in the ammonia plant air compression train to increase process air flow to the secondary ammonia reformer of an ammonia plant as well as upgrades to provide more pre-heating along with increased process air flow.

8 Claims, 6 Drawing Sheets

(56) References Cited

U.S. PATENT DOCUMENTS

2012/0128463 A1 5/2012 Held

FOREIGN PATENT DOCUMENTS

| EP | 0770578 A3 | 10/1998 |
|---|---|---|
| EP | 914294 B1 | 10/2001 |
| EP | 0703420 B1 | 11/2001 |
| WO | WO/2002/042209 A1 | 5/2002 |

AMMONIA PLANT UPGRADING-MULTISTAGE INTEGRATED CHILLING OF PROCESS AIR COMPRESSOR WITH AMMONIA COMPRESSOR FOLLOWED BY AIR FLOW SPLIT AND MULTISTAGE AIR PREHEATING TO SECONDARY AMMONIA REFORMER

CROSS REFERENCE TO RELATED APPLICATIONS

This application is a Divisional of U.S. Ser. No. 14/241,018 filed Feb. 25, 2014 based on PCT/US2013/054951 filed Aug. 14, 2013 and claims the benefit of U.S. application Ser. No. 61/684,684 filed Aug. 17, 2012 and U.S. application Ser. No. 61/706,305, filed Sep. 27, 2012.

FIELD

This disclosure relates to multistage chilling of a process air compressor by integrating refrigerant ammonia stream at different temperature levels from an existing or new ammonia compression system to provide air chilling leading to a significant increase in process air compression capacity and a much higher energy efficiency, with relatively low capital. In addition it relates to the downstream splitting and preheating of the resultant higher air production flow rates feeding the secondary reformer in an ammonia plant.

BACKGROUND

The process air compressor in most operating ammonia plants is normally the first major bottleneck to increase the ammonia production.

The process air compressor for typical average size ammonia plant is a multistage centrifugal machine driven by steam turbine using high-pressure superheated steam. It is one of the major consumers of steam in the plant.

To debottleneck the process air compressor in an existing plant, ammonia plant operators have conventionally used a combination of the following measures:
 a. Modification of existing compressor rotor and other essential internals of the compressor;
 b. Addition of a parallel new compressor with a driver
 c. Increased suction chilling of process air using an expanded external refrigerant system Items (a) and (b) require significant capital and downtime with a long delivery schedule besides modifications and/or additional driver and energy requirement of high pressure steam for the turbine drive. The option (a) could typically achieve about 20% additional capacity. The potential of capacity increase with option (b) is much more and also requires additional compression power, and increased capital and plot space than option (a). In most cases, these options are frequently not economically justifiable based on the payback criteria.

Suction chilling of Item (c) has been practiced for long time and is also an expensive option for process air compressors since it requires an external mechanical refrigeration system with additional compression energy and plot space. However, this option may be somewhat less expensive than the first two options (a and b) but provides only a modest increase in capacity and is rarely justified economically-evident from the fact that only a handful of plants implemented suction chilling in ammonia plants. However, it remains a common feature for gas turbines in power plants.

What is needed is a new approach which provides a significant increase in process air compression capability without extensive capital investment requirements in expensive external refrigeration systems, no additional power requirements for the air compressors, and no expensive modifications to the process air compressor.

SUMMARY

This need is met by the recognition that there are refrigerant ammonia streams available in ammonia plants from existing ammonia compressors. A multistage chilling of the process air compressor as well as suction chilling is proposed by the integration of selected refrigerant ammonia streams from an existing ammonia compression train to provide air chilling and as a result a significant capacity increase in the air compression system and reduced power consumption. In some cases only a marginal increase in power may be required but well within the limit of the existing driver. Two modes are presented—a direct multistage chilling and an indirect multistage chilling.

The integration is accomplished by an ammonia plant system upgrade utilizing a direct multistage chilling system in the ammonia plant air compression train to increase process air flow to the secondary ammonia reformer of the ammonia plant including at least: a two stage suction air chiller in the air compression system that chills incoming air by heat exchange with expanded high pressure ammonia from the ammonia compression system of the ammonia plant; additional two stage air chillers between each of the air compressors of the air compression train, each air chiller chilling incoming air by heat exchange with expanded high pressure ammonia from the ammonia compression system of the ammonia plant.

In a further upgrade the upgrade includes at least: a new steam preheater for heating the increased process air flow; wherein the preheated and increased production flow from the air compression train is separated into three streams which are further heated in: the existing dedicated process air preheat coils of the primary reformer; modified feed preheat convection coils of the primary reformer; and modified boiler feedwater convection coils; and wherein the combined heated three streams are fed to the secondary reformer.

In another embodiment the integration can be accomplished by an ammonia plant system upgrade utilizing an indirect multistage chilling system in the ammonia plant air compression train to increase process air flow to the secondary ammonia reformer of the ammonia plant including at least: a two stage suction air chiller in the air compression system that chills incoming air by heat exchange with chilled water from the ammonia compression system; additional two stage air chillers between each of the air compressors of the air compression train, each air chiller chilling incoming air by heat exchange with chilled water from the ammonia compression system; a staged water chiller that chills water for the air compression system by heat exchange with expanded high pressure ammonia from the ammonia compression train.

In a further upgrade of this indirect system the upgrade includes at least: a new steam preheater for heating the increased process air flow; wherein the preheated and increased production flow from the air compression train is separated into three streams which are further heated in: the existing dedicated process air preheat coils of the primary reformer; modified feed preheat convection coils of the primary reformer; and modified boiler feedwater convection coils; and wherein the combined heated three streams are fed to the secondary reformer.

BRIEF DESCRIPTION OF THE DRAWINGS

In FIGS. 1 through 6, like reference numerals designate the same components and structural features, unless otherwise indicated.

DETAILED DESCRIPTION

In the following detailed description some temperatures and pressures are presented to provide insight. These values can vary depending on the particular process air compression train and the relative size and capability of the equipment. These temperatures and pressures should not be construed as limitations in this application.

Figure 1:
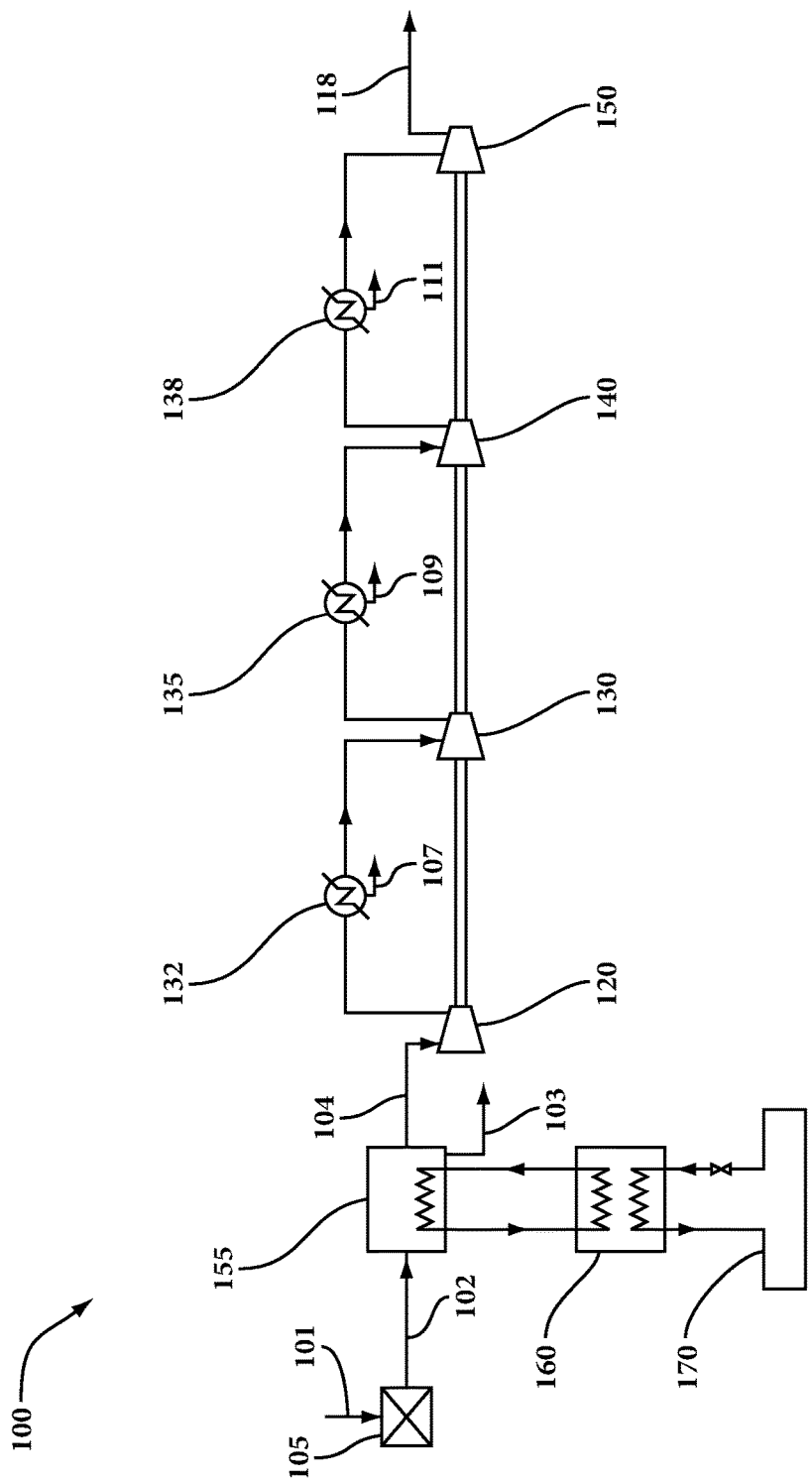
FIG. 1 is a schematic drawing of a prior art process air compression train in a typical ammonia plant.

Referring first to FIG. 1, a prior art process air compression train in an ammonia plant, is shown overall as numeral 100. Four compressor stages 120, 130, 140, and 150 are shown, with intercoolers 132, 135, and 138 used between compressors 120 and 130, compressors 130 and 140, and compressors 140 and 150, respectively. Inter-stage coolers 132, 135, and 138 use plant cooling water to partially remove the heat of compression and in the process remove some moisture 107, 109, and 111 as condensate. High pressure process air 118 is the output from the process air compression train.

On the suction side of compressor 120 the first compressor accepts filtered 102 and chilled 104 air from a suction air chiller 155 that both cools the filtered air and removes condensate 103. The filtered air is produced from a filter 105 drawing in atmospheric air 101. Suction chillers such as 155 are often not present in all prior art process air compression trains. Prior art suction air chillers such as 155 typically use chilled water supplied from a water chiller 160 that chills the water using a stand alone refrigeration package 170. Various refrigerants can be used in such packages, including the use of ammonia as the refrigerant.

As mentioned in the background section of this disclosure one option for increasing capacity is to significantly increase the capacity of the stand-alone refrigeration package. In practice this is an expensive option with a relatively modest improvement and it is not a part of the proposed embodiments of this disclosure.

Figure 2:
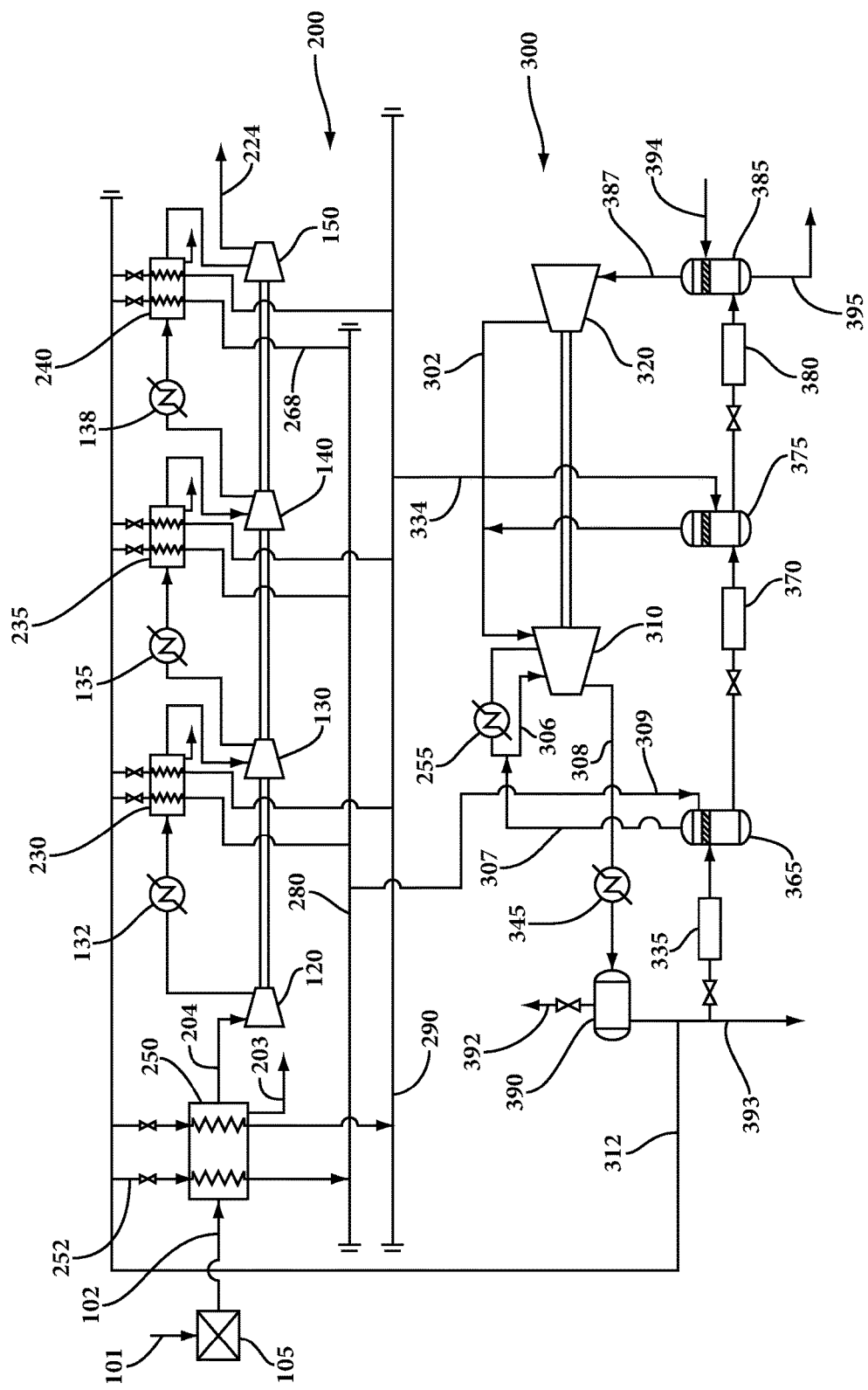
FIG. 2 is a schematic drawing of a direct integrated multistage air chilling embodiment of this disclosure.

FIG. 2 shows the ammonia plant upgrade using the direct integrated multistage embodiment of the disclosure. In this figure the numeral 200 represents the process air compression train and the numeral 300 an ammonia compression train. In an ammonia production plant there is always an ammonia compression train but it is not integrated with the air compression train to provide cooling. The overall FIG. 2 shows how the two are tied together, which is one of the embodiments of the present disclosure.

The air compression train, with its four compressor stages 120, 130, 140, and 150 are shown, with intercoolers 132, 135, and 138 used between compressors 120 and 130, compressors 130 and 140, and compressors 140 and 150, respectively. Inter-stage coolers 132, 135, and 138 again use plant cooling water to partially remove the heat of compression and in the process remove some moisture as condensate. Thus this aspect of the embodiment is not changed—that is to say—the existing compressors and inter-stage coolers are used. High pressure process air 224 exit compressor stage 150 is the output from the process air compression system in FIG. 2.

Added chillers 230, 235, and 240 are now in the process in each case following the intercoolers 132, 135, and 138 used between compressors. In addition a new suction air chiller 250 either replaces the previous suction air chiller 155 of FIG. 1 or is a new addition. Air chiller 250 accepts filtered air 102, removes condensate 203, and delivers chilled air 204 to compressor 120.

Numeral 300 exhibits the ammonia compression train that already exists in ammonia manufacture. This closed loop ammonia compression system involves three stages of compression in two casings, compressor casings 320 and 310. Compressor casing 310 has a lower pressure (LP) and a higher pressure (HP) section. Ammonia from the ammonia synthesis loop 394 enters into the low pressure flash drum 385. An ammonia vapor stream 387 is fed from the low pressure flash drum 385 to compressor 320 and compressor 320 compresses the vapor state to about 40 psig, shown as stream 302. At this stage the ammonia temperature is about 175° F. The compressed ammonia passes to second stage (high pressure case) ammonia compressor 310 where it is further compressed and inter-cooled by removing some of the ammonia and passing it through water pressurized ammonia cooler 255. The cooled ammonia in the vapor phase 306 is further compressed in the $3^{rd}$ stage of high pressure casing 310. The resulting higher pressure ammonia 308 passes through compressed ammonia cooler 345 to liquid ammonia buffer drum 390, where inert hydrocarbons 392 are removed and compressed ammonia 312 at about 235 psig and 100° F. is sent to the air compression train where it is used is to provide the additional chilling needed by the air compression system to boost the production capacity of the existing air compression train. Warm ammonia product 393 is drawn off at this point for other uses.

Still in FIG. 2, but turning now to the air compression train 200, the ammonia from the ammonia compression train is now used as a coolant in added chillers 230, 235, and 240, and in the new suction air chiller 250. These are all two stage chillers with the second stage being cooler than the first. In each of the added chillers and in the new suction air chiller the high pressure ammonia is expanded through valves to provide cooling and the resulting ammonia after passing through the coolers and chiller is collected in headers 280 and 290. Header 280 is at about 95 psig and header 290 is about 33 psig. The resulting enhanced cooling of the air stream progressing through the air compression train results in significant increase in air compression capacity with a minimum of new equipment investment.

The expanded ammonia from header 280 is at a higher pressure than that in header 290 and is returned (via 309) to high pressure flash drum 365 in the ammonia compression train 300 and is then flashed vapor recycled (via 307) back into the last compressor stage of compressor 310. The expanded ammonia from header 290 is at a lower pressure and is returned via stream 334 to medium pressure ammonia flash drum 375 from where some of the liquid ammonia is further expanded to provide cooling to various other plant users pressure. Expanded ammonia is fed, after cooling in heat exchanger 380, via stream 387 to the inlet of the LP stage of the ammonia compressor 320. The remaining ammonia vapors from ammonia flash drum 375 is combined with the compressed ammonia stream 302 exiting compressor 320. Additional cooling at the various pressure stages in the ammonia train is supplied by heat exchangers 335, 370, and 380, which are already existent in ammonia compression train 300.

This embodiment then represents an effective and affordable integration of an existing air compression train with an existing ammonia compression system to achieve a substantial increase in production with minimal capital investment.

Figure 3:
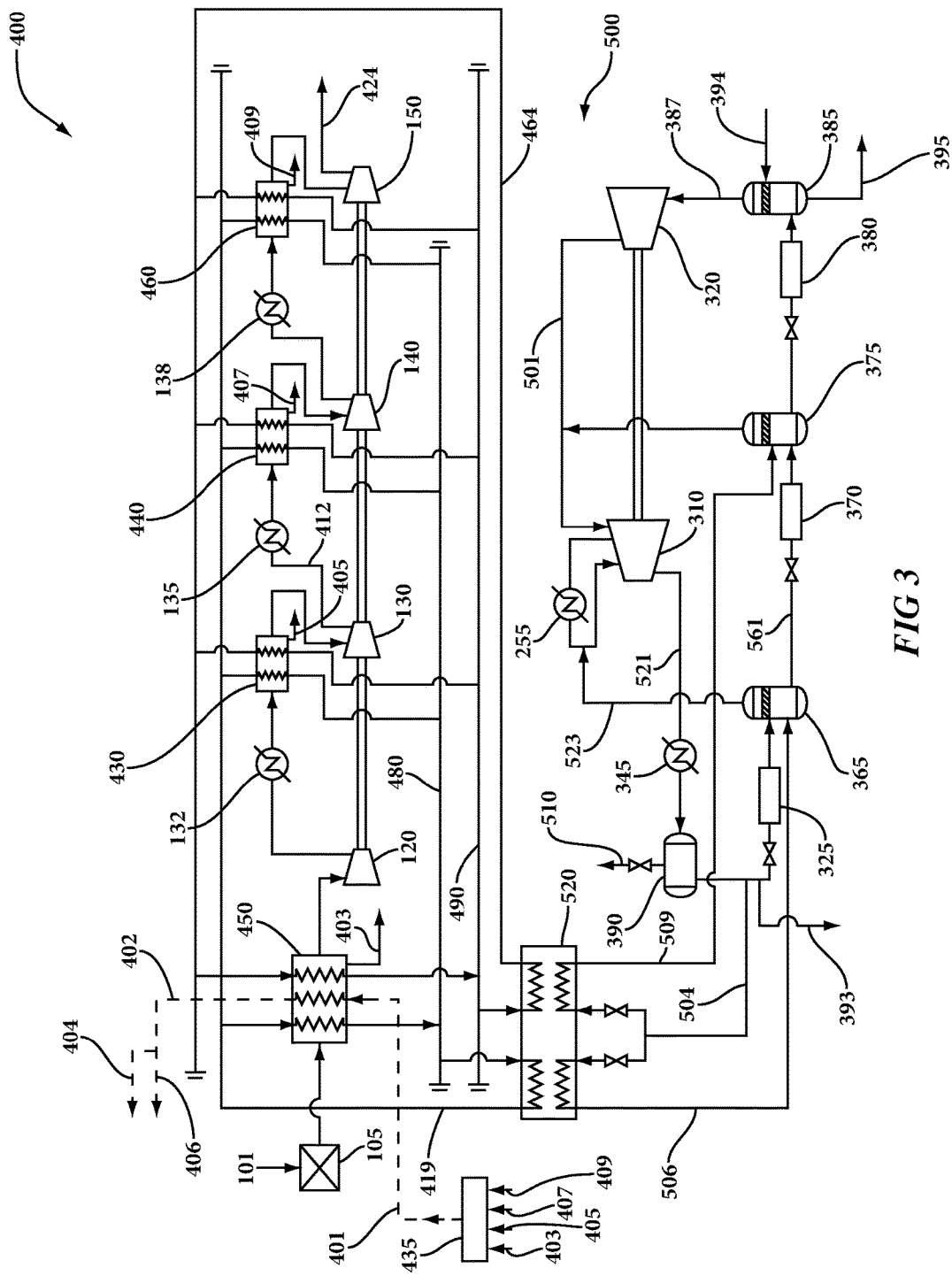
FIG. 3 is a schematic drawing of a indirect integrated multistage air chilling embodiment of this disclosure using ammonia and chilled water.

Turning now too FIG. 3 we describe an additional embodiment of the same inventive concept. The problem to be solved is again, how to increase air compression capacity with minimum capital expenditures and no additional power requirement. FIG. 3 shows an alternate embodiment that also uses high pressure ammonia from the ammonia compression unit but in a different way. This embodiment is termed Indirect Multistage Air Chilling and the key difference is that the air compression train does not see any direct contact with ammonia streams but instead uses chill water obtained from direct heat exchange from the ammonia compression train through a new staged water chiller 520. In FIG. 3 the numeral 400 represents the air compression train and the numeral 500 an ammonia compression train. In an ammonia production plant there is always an ammonia compression train but it is not integrated with the air compression train to provide and cooling or chilling. The overall FIG. 3 shows how the two are tied together, which is one of the embodiments of the present disclosure.

The air compression train, with its four compressor stages 120, 130, 140, and 150 are shown, with intercoolers 132, 135, and 138 used between compressors 120 and 130, compressors 130 and 140, and compressors 140 and 150, respectively. Inter-stage coolers 132, 135, and 138 again use plant cooling water to partially remove the heat of compression and in the process remove some moisture as condensate. Thus this aspect of the embodiment has the same arrangement as that of FIG. 2 and the existing compressors and inter-stage coolers are used. High pressure process air 424 is the output from compressor stage 150 of the process air compression system in FIG. 3.

In this embodiment suction air chiller 450 replaces the previous suction air chiller 250 of FIG. 2. And modified air chillers 430, 440, and 460 replace chillers 230, 235, and 240 of FIG. 2.

In this embodiment all of the chillers are configured to exchange heat with chilled water rather than expanded ammonia. As a result the two headers 480,490 are now chilled water headers. With this embodiment ammonia never enters the air compression train 400.

Numeral 500 exhibits the ammonia compression train that already exists in ammonia manufacture. This closed loop ammonia compression system involves three stages of compression, with LP and HP compressor casings 320 and 310 respectively. Ammonia from the ammonia synthesis loop 394 enters into the low pressure flash drum 385. An ammonia stream 587 is fed from a low pressure flash drum 385 to first stage ammonia compressor 320 and the LP compressor casing 320 compresses ammonia vapor to about 40 psig, shown as stream 501. For understanding, at this stage the ammonia temperature is about 175° F. The compressed ammonia passes to the high pressure ammonia compressor 310 where it is further compressed and water cooled by removing some of the ammonia and passing it through pressurized ammonia intercooler 255. The resulting higher pressure ammonia 521, after being compressed in the third stage passes through a water cooled condenser 345 to liquid ammonia buffer drum 390, where inert hydrocarbons 510 are removed. A portion of the liquid compressed ammonia stream 504 at about 235 psig and 100° F. is sent to a new staged water chiller 520 where it is expanded to provide for cooling and used is to chill the return cooling water from headers 480, 490 that provide the additional cooling needed by the air compression system to boost the production capacity of the existing air compression train.

A key sub-system in the FIG. 3 embodiment is the use of the new staged water chiller 520 to provide cooling to a chilled water loop used in the air compression train. High pressure ammonia 504 is supplied to staged water chiller 520 where it is expanded to provide cooling in the staged water chiller. The two stages result in two chilled water streams 419 and 464 that feed into each side of staged chillers 430, 440, 460, and 450 to provide enhanced cooling to the intermediate stages as well as the suction chiller of air compression.

An important embodiment is the management of water via condensate collection. Condensate streams 403, 405, 407, and 409 are collected and fed to condensate collection 435. The combined condensate stream 401 is used to provide additional cooling/chilling in the suction chiller 450 or could be used in the suction chiller 250 of FIG. 2 as well. After passing through suction chiller 450 the warm water condensate stream 402 is routed via stream 406 back to warm water header 480 and any excess condensate 404 is disposed of.

The usage of collected moisture/water condensate eliminates the need for any external source of make-up water needed for the water chiller 520 besides providing a addition cooling of process air, thereby, marginally reducing the compression load on the ammonia compressor train 500.

The recycle ammonia from the two stages of staged water chiller 520 consists of two streams expanded to two different pressures and as a result two different temperatures. The higher pressure and higher temperature stream 506 returns to high pressure ammonia flash drum 365 from where some of the expanded ammonia is fed, via stream 561 after expanding and cooling in a set of heat exchangers 370, to medium pressure ammonia flash drum 375. The remaining ammonia vapor from high pressure ammonia flash drum 365 is fed, via stream 523 to the second stage of the high pressure stage of second stage ammonia compressor 310.

The second lower pressure and lower temperature recycle ammonia stream 509 feeds medium pressure ammonia flash drum 375. From the flash drum 375 the liquid ammonia is further expanded to provide cooling for various plant users through a set of heat exchangers 380, and flashed into low pressure flash drum 385 and is routed via stream 587 to the inlet of first stage ammonia compressor 320. The liquid ammonia from flash drum 385 is taken as product ammonia 395 and further routed to storage tanks via pumps as required. Ammonia vapors from ammonia flash drum 375 is combined with the compressed ammonia stream 501 exiting compressor 320.

In this embodiment there is no recycle ammonia from the air compression train returning to the ammonia compression system as in streams 309 and 334 in FIG. 2.

This embodiment then represents an alternate effective and affordable integration of an existing air compression train with an existing ammonia compression system to achieve a substantial increase in production with minimal capital investment.

It should also be noted that in most ammonia plant revamps—the ammonia converter in the synthesis loop is upgraded by increasing the ammonia conversion either by upgrading the converter internals and/or additional catalyst bed together with optimum operating parameters. This upgrade of the synthesis loop results in reduced load on the ammonia compressor to the extent of incremental ammonia conversion. The extra capacity on ammonia compressor is mainly utilized to increase the ammonia production to the economic limits of the front end section of ammonia plant. The remaining available capacity of ammonia compressor is being utilized by integrating it with the process air compressor as per this disclosure.

Figure 4:
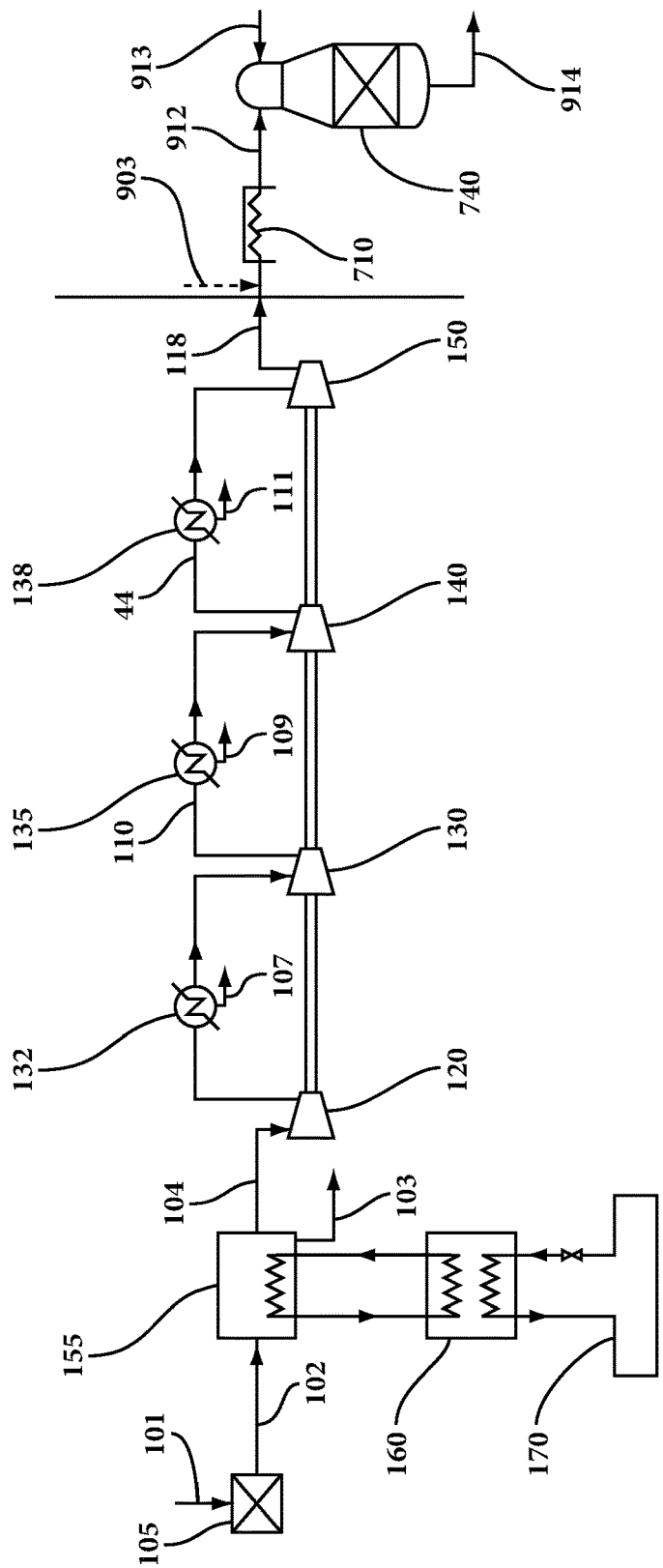
FIG. 4 is a schematic drawing of a prior art process air compression train showing its connection to the secondary reformer in the ammonia plant.

The advantages presented in the multistage integrated chilling of Process air compressor significantly increases the Process air capacity—which provides the following key benefits in Ammonia plant:
   a. Reduced compression power for the same capacity or higher capacity for practically the same power
   b. Reduced fuel firing in the Primary reformer resulting in further energy savings
   c. Lower methane slip from the Secondary reformer—resulting in lower inerts and lower H2/N2 ratio in the Make Up Gas (MUG) to the Ammonia synthesis loop—which results in higher Ammonia production As shown in FIG. 4 (prior art) The compressed process air 118 in Ammonia plants is further preheated through convection coils of the Primary Reformer (a small amount of medium pressure steam 903 is also added to it before preheating). The preheated process air mixture 912 is then injected into the Secondary reformer 740 to provide the necessary heat of reforming and also to adjust the required H2/N2 ratio for the Ammonia synthesis reaction. The process air is conventionally preheated in the existing dedicated convection coils 710 of the Primary reformer by exchanging heat against the hot flue gases 917.

Figure 5:
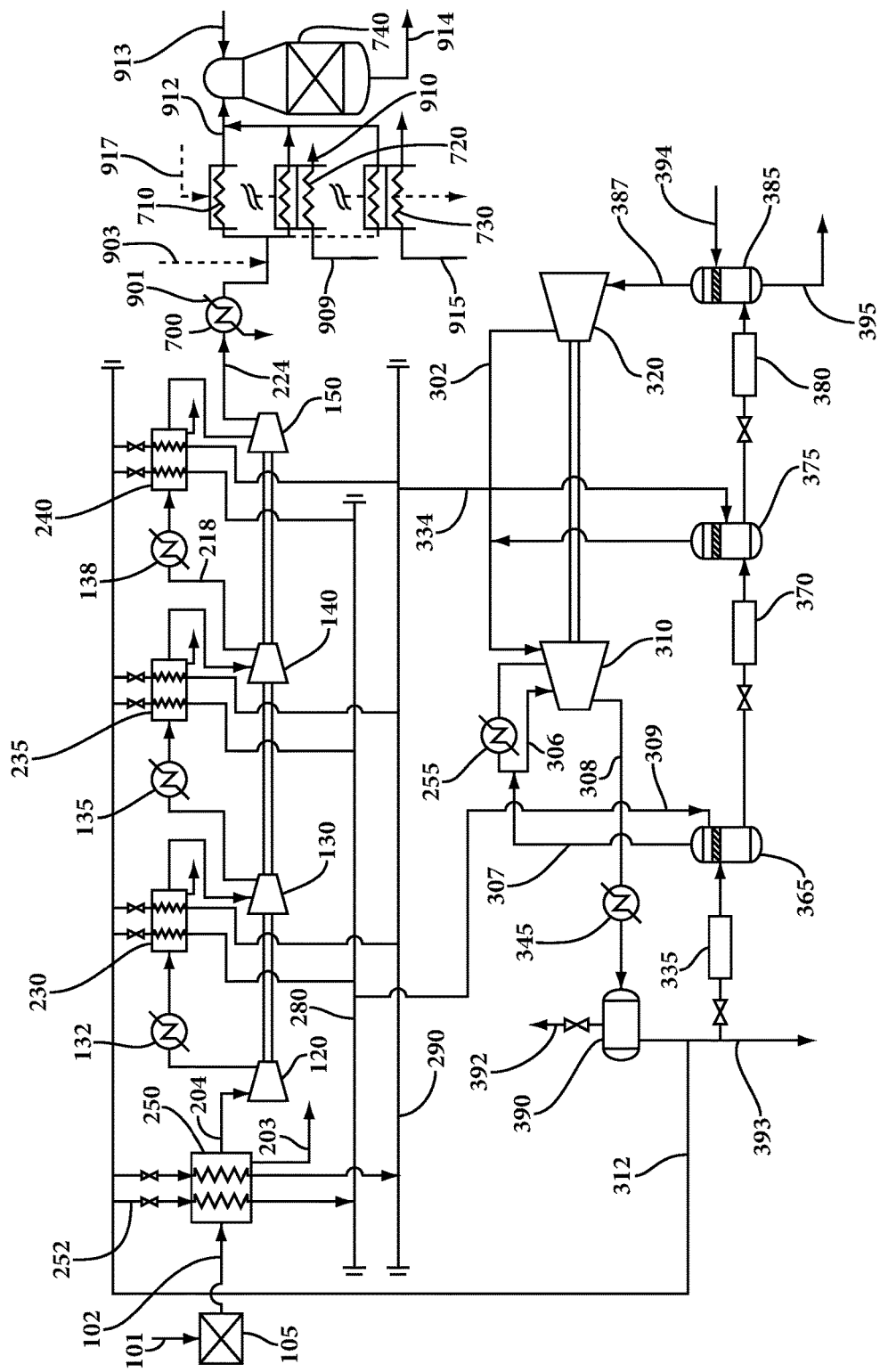
FIG. 5 is a schematic drawing of a direct integrated multistage air chilling embodiment of this disclosure with a disclosed modification of the heating arrangement for the secondary reformer.
Figure 6:
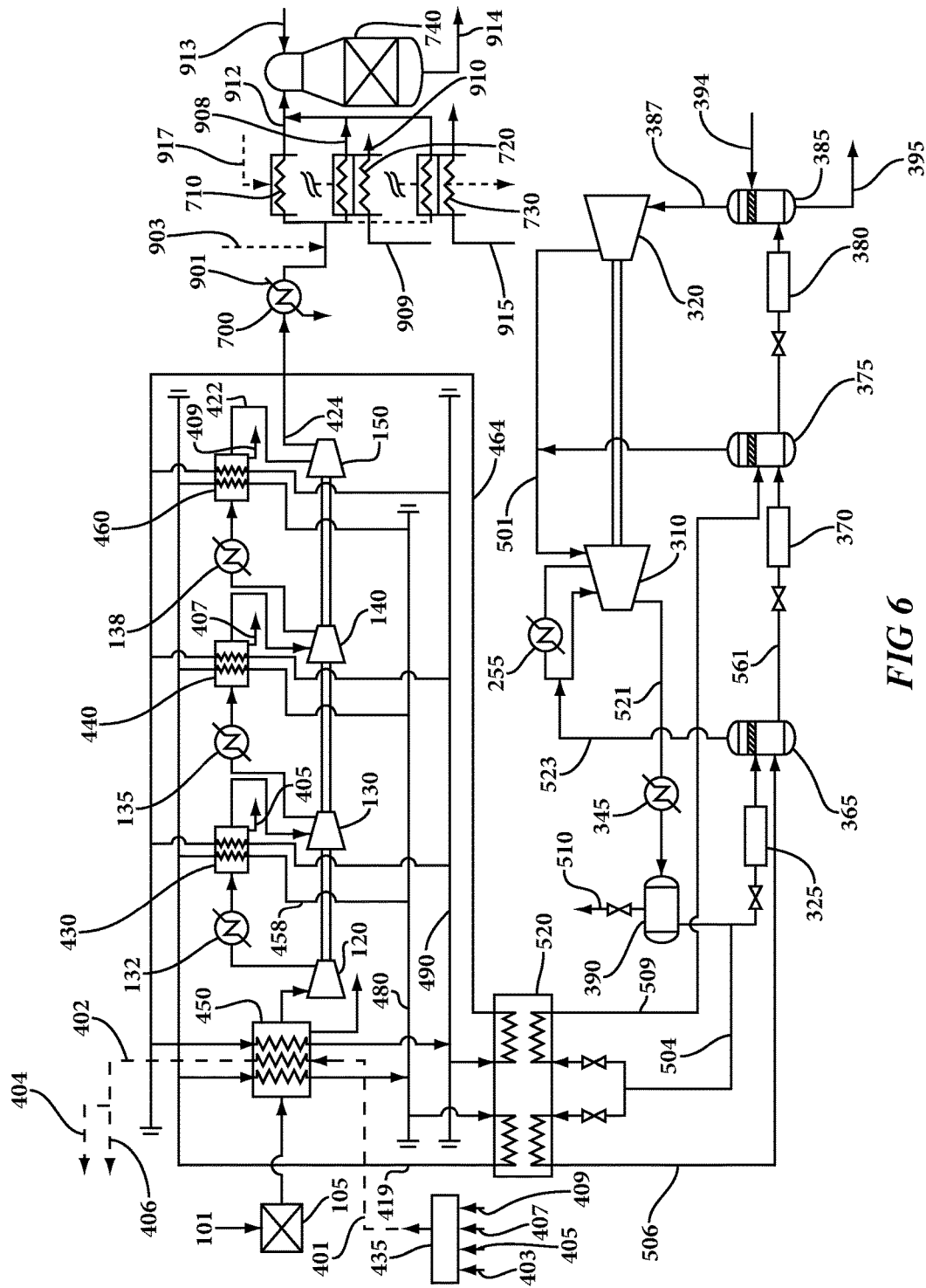
FIG. 6 is a schematic drawing of a direct integrated multistage air chilling embodiment of this disclosure with a disclosed modification of the heating arrangement for the secondary reformer.

The increase in the process air flow requires an additional heat transfer surface of convection preheat coils to maintain or increase the degree of process air preheat. Conventionally, the convection air preheat coils are modified with additional heat transfer surface depending on the available space in the existing convection section. This typical scheme 'as prior art' is shown in FIG. 4. In most of the existing Ammonia plant reformers, the additional space to accommodate more heat transfer surface in the convection section is usually not available. The space constraint in the convection section limits the full benefits of increased air flow as the temperature of preheated air will reduce with higher flow of process air; resulting in a relatively lower conversion of methane in the Secondary reformer. To overcome this limitation, an additional embodiment scheme is proposed for either the direct chilling embodiment of FIG. 2 or the indirect chilling embodiment of FIG. 3. The resultant new embodiments are shown in FIG. 5 and FIG. 6.

These embodiments—based on multistage preheating and splitting of process air to significantly raise its temperature to the limits of maximum design limits include the following:
   a. The first stage preheating of process air is done outside the existing convection section using a new high pressure steam heat exchanger 700.
   b. Following the first stage preheating—the process air flow is split in two or more streams to be further preheated through the existing process air convection coil and through other identified coils in the convection section.

These embodiments come from the following analysis. The existing convection coils of various process services that have excess heat transfer area than required by the respective process service are first identified. In many existing ammonia plants, the feed preheat convection coil 720 and boiler feed water (BFW) 915 preheat convection coils 730 tend to be over-surfaced than required—especially in the revamp situations. This offers the opportunity to convert the excess heat transfer surface of those convection coils for additional air preheating by splitting the total process air flow as follows:

Compressed process air (224 in FIG. 5 or 424 in FIG. 6) is first preheated in a new steam air preheater 700—outside the convection section. This is done with pressure steam 901. The preheated air flow from (or before the steam exchanger) is then split in two or three parts to be further preheated in the convection section as follows; between 60% to 85% of the total air flow is routed to the existing dedicated process air preheat coils 710. And between 15% to 40% of air is routed to the modified feed preheat convection coil 720 for air preheating service and between 15% to 40% of air is routed to the modified boiler feed water (BFW) preheat convection coil 730 for air preheating service. A hydrocarbon feed inlet 909 and exit 910 passes through existing feed preheat convection coils 720. Boiler feed water 915 is also heated in the existing boiler feed water convection coils.

The combined flow preheated air 912 from these three sources is then fed, along with reformed gas 913 from the primary reformer into secondary reformer 740, resulting in 914 reformed gas from the secondary reformer.

Multistage external preheating of process air including the external preheating coupled with splitting the air flow for further preheating results in the following benefits:
   a) Splitting the process air flow in two or three parts reduces the pressure drop in the process air path—thereby further reducing compression energy of process air compressor;
   b) Multistage external preheating of process air coupled with the additional heat transfer surface area utilization in the convection section significantly raises the air preheat temperature—thereby reducing methane slip to the secondary reformer while reducing firing in the Primary reformer and also resulting in higher ammonia production with further energy savings;
   c) Reduced air flow and heat duty in the existing convection air coils raises the temperature of flue gas leaving it. The higher flue gas temperature entering the next convection coil for steam superheating—raises the temperature of the superheated steam. Higher steam superheat temperature further reduces the steam demand for the steam drivers of various compressors in the ammonia plant.

The present disclosure has been described with reference to specific details of particular embodiments. It is not intended that such detail be regarded as limitations upon the scope of the disclosure except insofar as and to the extent that they are included in the accompanying claims.

The invention claimed is:

1. An upgrade to an existing ammonia plant utilizing a new indirect multistage chilling system in an existing ammonia plant air compression train of the existing ammonia plant to increase process air flow to an existing secondary ammonia reformer of the existing ammonia plant comprising:
   a. a new two stage suction air chiller in the existing ammonia plant air compression train that chills incoming process air by heat exchange with chilled water from an existing ammonia compression system;
   b. additional new two stage air chillers between each of existing air compressors of the existing ammonia plant air compression train, each new air chiller chilling incoming air by heat exchange with chilled water from the existing ammonia compression system;
   c. a new staged water chiller that chills water for the existing ammonia plant air compression system by heat exchange with expanded high pressure ammonia from the existing ammonia compression train.

2. The ammonia plant system upgrade utilizing the new indirect multistage chilling system in the ammonia plant air compression train of the existing ammonia plant to increase process air flow to the existing secondary ammonia reformer of the existing ammonia plant of claim 1 further comprising:
   a. an added new steam preheater for preheating the increased process air flow;
   b. wherein the preheated and increased process air flow from the air compression train is separated into three streams which are further heated in:
      i. existing dedicated process air preheat convection coils in the existing ammonia plant; and
      ii. available excess heat transfer surface of existing feed preheat convection coils in the existing ammonia plant modified to accommodate a portion of the preheated and increased process air flow from the existing air compression train of the existing ammonia plant; and
      iii. available excess heat transfer surface of existing boiler feedwater convection coils of the existing ammonia plant modified to accommodate a portion of the preheated and increased process air flow from the existing air compression train of the existing ammonia plant; and
   c. wherein the combined heated three streams are fed to the existing secondary ammonia reformer of the existing ammonia plant.

3. A method for upgrading an existing ammonia plant utilizing a new indirect multistage chilling system in an existing ammonia plant air compression train to increase process air flow to an existing secondary ammonia reformer of the existing ammonia plant comprising the steps of:
   a. providing a new two stage suction air chiller in the existing ammonia plant air compression train for chilling incoming air by heat exchange with expanded high pressure ammonia from an existing ammonia compression system of the existing ammonia plant;
   b. providing additional new air chillers between each stage of existing air compressors of the existing air compression train of the existing ammonia plant for chilling the compressed incoming air to each of the stages of an existing air compressor by heat exchange with expanded high pressure ammonia from the existing ammonia compression system of the existing ammonia plant; and
   c. providing a new staged water chiller for chilling water for the existing air compression system by heat exchange with expanded high pressure ammonia from the existing ammonia compression train.

4. The method for upgrading the existing ammonia plant utilizing the new indirect multistage chilling system in the existing ammonia plant air compression train to increase process air flow to the existing secondary ammonia reformer of the existing ammonia plant of claim 3 further comprising the steps of:
   a. providing an added new steam preheater for heating the increased process air flow;
   b. splitting the preheated and increased process air flow from the air compression train into three streams;
   c. wherein each of the three streams are further heated in:
      i. available existing dedicated process air preheat convection coils in the existing ammonia plant; and
      ii. available excess heat transfer surface of existing feed preheat convection coils in the existing ammonia plant modified to accept a portion of the preheated and increased process air flow from the air compression train of the existing ammonia plant; and
      iii. modified available excess heat transfer surface of existing boiler feedwater convection coils modified to accept a portion of the preheated and increased process air flow from the air compression train of the existing ammonia plant; and
   d. wherein the heated three streams are combined and fed to the secondary ammonia reformer.

5. An ammonia plant utilizing an indirect multistage chilling system in an ammonia plant air compression train of the ammonia plant to increase process air flow to a secondary ammonia reformer of the ammonia plant comprising:
   a. a new two stage suction air chiller in the ammonia plant air compression train that chills incoming process air by heat exchange with chilled water from an ammonia compression system of the ammonia plant;
   b. additional two stage air chillers between air compressors of the ammonia plant air compression train, each new air chiller chilling incoming air by heat exchange with chilled water from the ammonia compression system;
   c. a new staged water chiller that chills water for the ammonia plant air compression system by heat exchange with expanded high pressure ammonia from the ammonia compression train.

6. The ammonia plant utilizing the indirect multistage chilling system in the ammonia plant air compression train of the ammonia plant to increase process air flow to the secondary ammonia reformer of the ammonia plant of claim 5 further comprising:
   a. a new steam preheater for preheating the increased process air flow;
   b. wherein the preheated and increased process air flow from the air compression train is separated into three streams which are further heated in:
      i. dedicated process air preheat convection coils in the ammonia plant; and
      ii. available excess heat transfer surface of feed preheat convection coils in the ammonia plant modified to accommodate a portion of the preheated and increased process air flow from the air compression train of the ammonia plant; and
      iii. available excess heat transfer surface of boiler feedwater convection coils of the ammonia plant modified to accommodate a portion of the preheated and increased process air flow from the air compression train of the ammonia plant; and c. wherein the heated three streams are combined and fed to the secondary ammonia reformer of the ammonia plant.

7. A method for ammonia production utilizing a new indirect multistage chilling system in an ammonia plant air compression train to increase process air flow to a secondary ammonia reformer of the ammonia plant comprising the steps of:
   a. providing a new two stage suction air chiller in the ammonia plant air compression train for chilling incoming air by heat exchange with expanded high pressure ammonia from an ammonia compression system of the ammonia plant;
   b. providing additional new air chillers between each stage of air compressors of the air compression train of the ammonia plant for chilling the compressed incoming air to each of stages of an air compressor by heat exchange with expanded high pressure ammonia from the ammonia compression system of the ammonia plant; and
   c. providing a new staged water chiller for chilling water for the air compression system by heat exchange with expanded high pressure ammonia from the ammonia compression train.

8. The method for ammonia production utilizing the new indirect multistage chilling system in the ammonia plant air compression train to increase process air flow to the secondary ammonia reformer of the ammonia plant of claim 7 further comprising the steps of:
   a. providing a new steam preheater for heating an increased process air flow;
   b. splitting the preheated and increased process air flow from the air compression train into three streams;
   c. wherein each of the three streams are further heated in:
      i. available dedicated process air preheat convection coils in the ammonia plant; and
      ii. available excess heat transfer surface of feed preheat convection coils in the ammonia plant modified to accept a portion of the preheated and increased process air flow from the air compression train of the ammonia plant; and
      iii. modified available excess heat transfer surface of boiler feedwater convection coils modified to accept a portion of the preheated and increased process air flow from the air compression train of the ammonia plant;
   d. wherein the heated three streams are combined and fed to the secondary ammonia reformer.

* * * * *